United States Patent [19]

Tice et al.

[11] Patent Number: 5,117,219

[45] Date of Patent: * May 26, 1992

[54] SMOKE AND FIRE DETECTION SYSTEM COMMUNICATION

[75] Inventors: Lee D. Tice, Bartlett, Ill.; Todd W. Fritz, Jackson, Mich.; Mark A. Kilcommons, Berwyn, Ill.

[73] Assignee: Pittway Corporation, St. Charles, Ill.

[*] Notice: The portion of the term of this patent subsequent to Apr. 10, 2007 has been disclaimed.

[21] Appl. No.: 472,225

[22] Filed: Jan. 30, 1990

Related U.S. Application Data

[63] Continuation of Ser. No. 111,811, Oct. 21, 1987, Pat. No. 4,916,432.

[51] Int. Cl.⁵ .............................................. G08B 26/00
[52] U.S. Cl. ..................................... 340/518; 340/505; 340/506; 340/510; 340/511; 340/514
[58] Field of Search ............... 340/518, 505, 514, 506, 340/825.06, 825.67-825.1, 510

[56] References Cited

U.S. PATENT DOCUMENTS

| | | | |
|---|---|---|---|
| 4,507,652 | 3/1985 | Vogt et al. | 340/505 |
| 4,535,401 | 8/1985 | Penn | 340/505 |
| 4,586,040 | 4/1986 | Akiba et al. | 340/505 |
| 4,613,848 | 9/1986 | Watkins | 340/505 |

Primary Examiner—Donnie L. Corsland

Attorney, Agent, or Firm—Dressler, Goldsmith, Shore, Sutker & Milnamow

[57] ABSTRACT

A smoke and fire detection system wherein a central controller transmits data to remote transponders on a voltage supply line by pulse code modulation (PCM) of the supply voltage, and the transponders communicate with the controller by pulse width modulated (PWM) current pulses over the voltage supply line. A transmitter in the controller supplies a nominal operating voltage to the transponders and transmits a data word comprising a plurality of data bits to the transponders over the line. The transmitter generates each data bit by switching the voltage supplied to the line from the nominal operating voltage to a first voltage corresponding to a first logical level or a second voltage corresponding to a second logical level. A decoder in each transponder derives the transmitted data word. The decoder detects each data bit by detecting the transition from the nominal voltage to the first or second voltage, and the decoder determines the logical level of each bit by measuring the transmitted voltage level immediately after detecting the transition. The transponder returns data to the controller in the form of data signals, each data signal having a duration based on the data to be returned. With such arrangement, the transponders do not require a clock or other timing circuitry to communicate with the controller. Also, the controller may vary the data rate or bit duration without interfering with the operation of the transponders.

11 Claims, 8 Drawing Sheets

SMOKE AND FIRE DETECTION SYSTEM COMMUNICATION

This is a continuation, of application Ser. No. 111,811, filed Oct. 21, 1987 now U.S. Pat. No. 4,916,432.

BACKGROUND OF THE INVENTION

This invention relates to interactive communication within smoke and fire detection systems.

In detection systems in which a central controller is connected to a number of transponders (containinq smoke/fire detectors) by a two-wire communication line, it is known to both supply power to the transponders and pass data to and from the transponders over the line. The controller periodically "polls" and tests the status (e.g. the smoke sensitivity) of a selected transponder by addressing the selected transponder, over the communication line, and sending a command for the transponder to return a signal representative of its status to the controller via the line.

In one such system, described in Voqt, et al., U.S. Pat. No. 4,507,652, "Bidirectional Interactive Fire Detection System," issued Mar. 26, 1985, the controller selectively addresses the transponders by transmitting a succession of pulse groups over the line, each pulse group corresponding to one of the transponders. Each transponder counts the number of pulse groups until its pulse group has been reached and then responds to any command included in that pulse group. The commands are indicated by extending the duration of particular pulses in the group. The transponder senses when a pulse has remained high beyond a threshold time duration to detect the elongated pulse and hence the corresponding command. The transponder transmits sensitivity data to the controller by drawing a current pulse from the communication line having a duration corresponding to the sensitivity of the detector. The controller measures the current pulse duration to determine whether the detector sensitivity is in, for example, a "normal" or "alarm" range. The transponder also is able to return a separate calibration signal to the controller to more accurately determine the status (i.e. "normal" or "alarm") of the detector.

SUMMARY OF THE INVENTION

One general feature of the invention provides a fire detection system of the kind in which a controller sends data to a plurality of transponders via a communication line in the form of a series of pulses; the amplitudes of the pulses represent the data in accordance with a pulse code; the transponders detect the start of each pulse on the line and decode each pulse based solely on its amplitude level, whereby the pulses may be decoded without regard to the particular time when each the pulse begins or to its duration; and the transponder returns data to the controller in the form of data signals, each data signal having a duration based on the data to be returned.

Preferred embodiments of the invention include the following features. When no pulse is being formed, the communication line is driven at a first relatively high voltage, and when a pulse is being sent, the communication line is driven to a lower voltage. The pulses are encoded as either zero-valued or one valued bits by driving the communication line to, respectively, two different lower voltages. The transponder includes power supply circuitry for deriving power from the line when the line is driven at the high voltage. and for delivering the power to the transponder. At the transponder, the start of each pulse is detected by watching for a voltage transition beyond a threshold value on the communication line.

Another general feature of the invention provides a fire detection system of the kind in which a plurality of transponders each sends data to a controller via a communication line; the data is sent in the form of a group of data signals, each data signal having a duration based on data presented at the input of transmission circuitry in the transponder; a reference value is presented at the input of the transmission circuitry in order to provide a reference signal of a predetermined nominal duration at the controller end of the communication line; every group of data signals is accompanied by a current reference signal; and the controller detects the actual durations of the data signals and the actual duration of the associated reference signal for use in calibration.

In another general feature of the invention, the controller transmits the pulses at a selectable pulse rate. In preferred embodiments, the transponders detect the start of each pulse on the line and decode each pulse based solely on its amplitude level.

In another general feature of the invention, at least some of the commands are capable of shifting the function being performed by the transponder; the controller encodes the commands in a binary code in such a manner that the codes for two commands that require different functions to be performed by the transponder differ in a least two bit positions; and the transponder detects whether a given command received from the controller differs in at least two bit positions from an earlier command received from the controller.

Preferred embodiments include the following features. The function being performed by the transponder is shifted only when the same command is detected twice. In one function, the transponder returns to the controller a value representative of the response of a transducer associated with the transponder. In another function. The transponder returns to the controller a value representative of a hypothetical alarm response of the transducer.

In another general feature of the invention, the controller sends the data in the form of a succession of 13-bit words, each one-valued bit being represented by a first voltage level on the communication line, each zero valued bit being represented by a second voltage level on the communication line, the 13-bit word including a nine-bit address word, a 3-bit command word, and a parity bit; and the transponder returns data to the controller following the receipt of each 13-bit word, the data being returned in the form of five pulses, each represented by the drawing of current from the communication line for a period having a duration representative of a corresponding data value.

In preferred embodiments, the controller averages successive values of the data returned from the transponders to enhance immunity to noise; the transponder draws a relatively high level of current at the beginning of each data signal and draws a reduced level of current during the remainder of the data signal, to improve noise immunity; and the current on the communication line is kept constant by the controller despite voltage changes on the line caused by noise.

The invention provides an efficient, fast, and accurate communication protocol. The transponder requires no independent source of power and need not have a clock to cadence its detection of the commands and addresses sent from the controller. The system is relatively immune from noise (including ringing noise) on the line, even when the line is a simple two-wire link. The transponder need have no complicated transmission or driver circuitry, for it returns data simply by drawing current on the line for a selected period.

Other advantages and features will become apparent from the following description of the preferred embodiment, and from the claims.

DESCRIPTION OF THE PREFERRED EMBODIMENT

We first briefly describe the drawings.

STRUCTURE AND OPERATION

Figure 1:
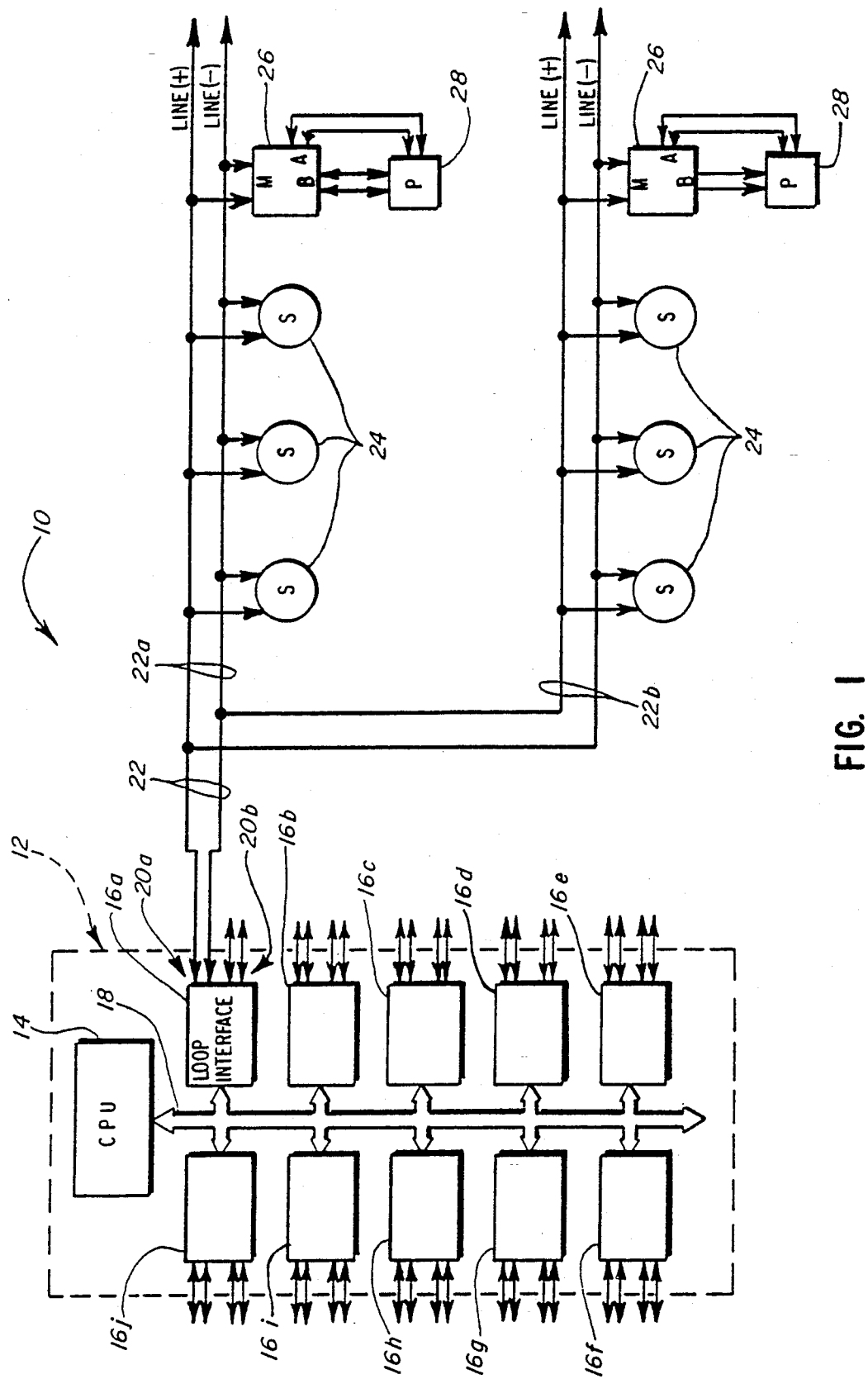
FIG. 1 is a block diagram of a smoke/fire detection and alarm system.

Referring to FIG. 1, a smoke/fire detection and alarm system 10 comprises controller 12, which includes a central processing unit (CPU) 14 and a number, here ten, of loop interface sections 16a-16j connected to CPU 14 via a two-way data bus 18. Loop interface sections 16a-16j each have two sets of input/output ports 20a, 20b, each connected to a standard two-wire communication line, e.g., line 22 connected to input/output port 20a of loop interface section 16a.

Communication line 22 has two parallel branches 22a, 22b, (a greater or fewer number of branches may be used). Six smoke/fire detector transponders 24 are connected to communication line branches 22a, 22b, as are a pair of module transponders 26. Module transponders 26 are further connected to peripheral devices 28, such as sounders, strobes, door closers, or water flow switches.

Figure 2:
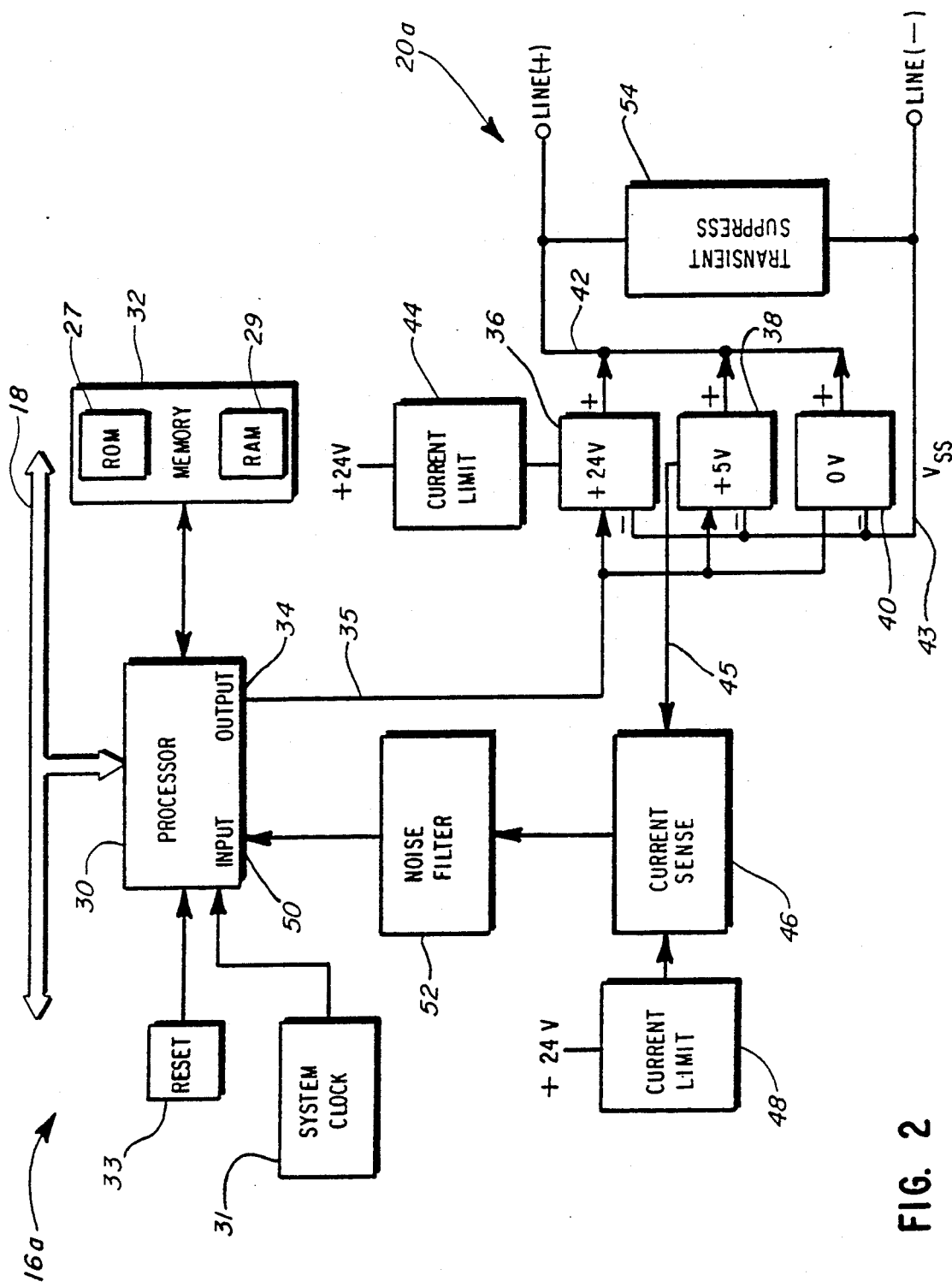
FIG. 2 is a block diagram of a loop interface section of the system of FIG. 1.

Referring to FIG. 2, each loop interface section 16a-16j, for example, loop interface section 16a, includes a processor 30 connected to data bus 18 via a data bus interface (not shown). Processor 30 is cadenced by a system clock 31, and is connected to a memory 32, that includes a read only memory 27 (ROM) and a random access memory 29 (RAM). Processor 30 is also connected to a reset unit 33. Processor 30 operates in accordance with a program stored in ROM 27.

Data output terminal 34 of processor 30 provides control signals to a 24V line driver 36, a 5V line driver 38, and a 0V line driver 40 via bus 35. The (+) outputs of line drivers 36, 38, 40 are connected in a wired-AND configuration to line (+) 42, one of the conductors of two-wire communication line 22 (FIG. 1). The (−) ports of drivers 36, 38, 40 are connected in common to line (−) 43 to establish a reference potential $V_{ss}$ on line (−).

A power supply (not shown) in controller 12 (FIG. 1) makes available +24 volts DC to loop interface sections 16a-16j with respect to $V_{ss}$. Processor 30, by enabling 24V driver 36 via bus 35, couples the 24 volts DC over communication line 22 to supply operating power for transponders 24, 26. As will be discussed, processor 30 also transmits data (e.g., addresses and commands) to transponders 24, 26 by pulse code modulating (PCM) the 24V potential across line 22 with 5V or 0V pulses (by sending control signals on bus 35 to either 5V driver 38 or 0V driver 40, respectively). A current-limiter 44 is connected between the 24 volt DC supply and 24V driver 36 to avoid passing too much current to transponders 24, 26 during PCM data transmission.

Transponders 24, 26 return data (e.g. data representing the response of a transponder) to loop interface section 16a by drawing current for defined periods of time on communication line 22 when the voltage across line 22 is 5 volts. The time durations (i.e., widths) of such current drawing periods (i.e., pulses) are pulse width modulated (PWM) in accordance with the data being returned to loop interface section 16a, as will be explained. A current sensor 46, connected to communication line 22 via line 45 and 5V driver 38, detects when a transponder 24, 26 is drawing current. Transponders 24, 26 are prevented from drawing more than a predetermined current level by a current limiter 48 connected between current sensor 46 and the +24V DC supply.

The output of current sensor 46 is applied to data input terminal 50 of processor 30 via a low pass noise filter 52. Filter 52 removes transients caused by the noise and other interference picked up by communication line 22. Transient power (i.e. surge) protection is provided by a suppressor 54 connected across input port 20a. Another set of 24V, 5V, and 0V drivers (not shown) are connected in a similar manner between processor 30 and output port 20b (FIG. 1).

Figures 3, 5:
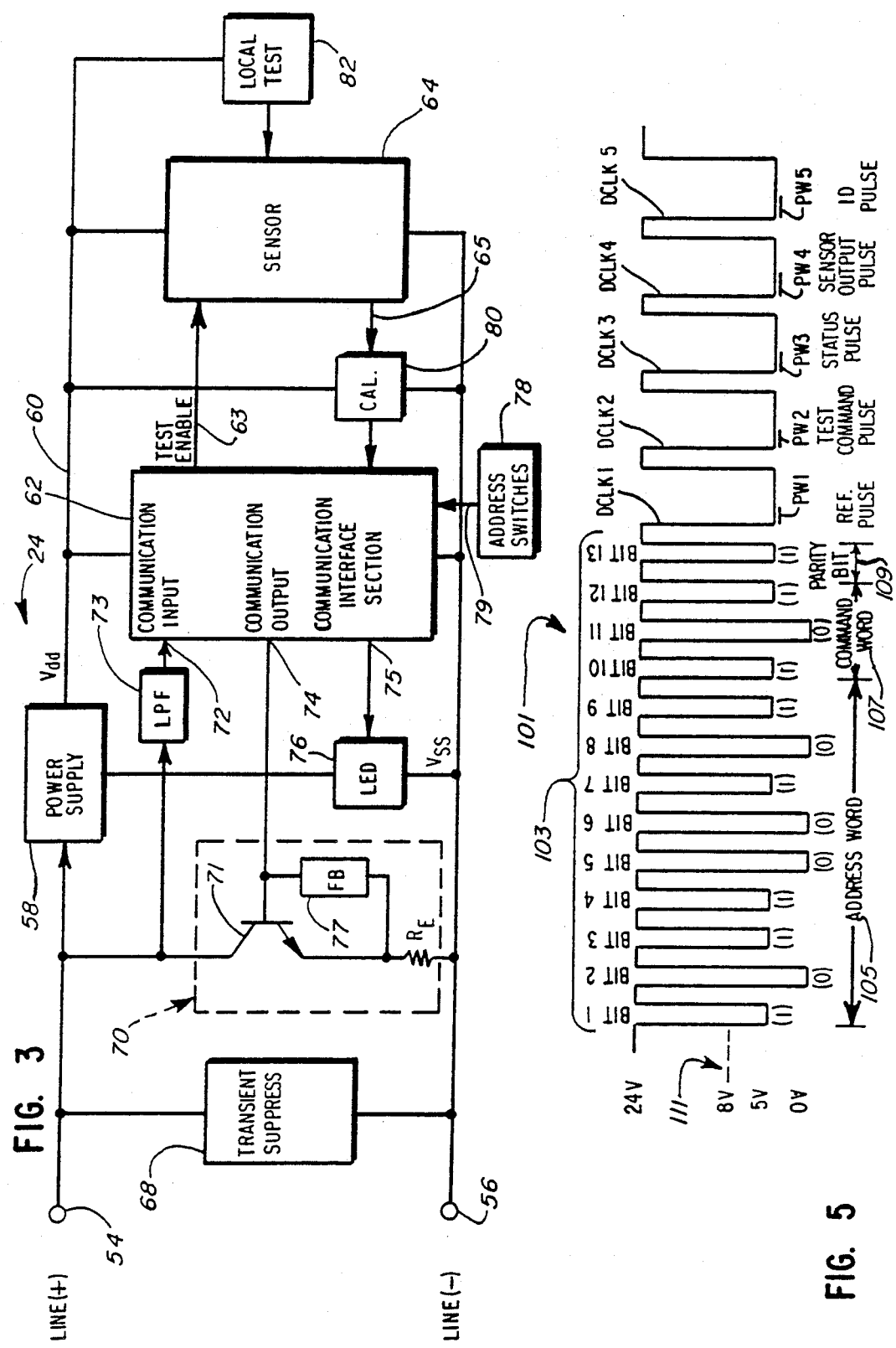
FIG. 3 is a block diagram of a detector transponder of the system of FIG. 1.
FIG. 5 is a representative communication waveform for the system of FIG. 1.

Referring to FIG. 3, a smoke/fire detector transponder 24 includes a pair of input/output ports 54, 56 connected to two-wire communication line 22 (FIG. 1). The operating voltage received from loop interface section 16a via communication line 22 is rectified and regulated in power supply 58 to produce operating voltage $V_{dd}$, here, +10.5 volts DC, on line 60. Regulated voltage $V_{dd}$ provides operating power for a communication interface section 62 and a sensor 64, which are electrically connected to input/output port 56 (and hence to reference potential $V_{ss}$) via return line 66. Power supply 58 also produces rectified but unregulated operating voltage for a light emitting diode (LED) indicator section 76. Power supply 58 includes a storage capacitor (not shown) for maintaining the operating voltage supplied to communication interface section 62 and sensor 64 at 10.5 volts during data transmission to and from transponder 24 (i.e., at times when the line voltage on line 22 may be 5V or 0V).

Suppressor 68 is connected directly across input/output ports 54, 56 for protecting the transponder components from signal transients on communication line 22 and accidental polarity reversal in the connection of ports 54, 56 to line 22. Output current driver 70 is also connected directly across input/output ports 54, 56, as shown. Input/output port 54 is connected to input port 72 of communication interface section 62 through a low-pass noise filter 73.

Communication interface section 62 receives the PCM data transmitted by loop interface section 16a at input port 72 and responds to the data by producing a PWM control signal at output port 74 for output current driver 70, and (in some cases) a control signal at output port 75 for LED indicator section 76, as discussed in detail below. Address section 78 (comprising, for example, a bank of switches) is preprogrammed with a unique address for each transponder 24; the unique address is applied to communication interface section 62 on line 79.

Sensor 64 may be any one of a variety of smoke or fire detection sensors, for example, an ionization or photoelectric smoke detector or a thermal sensor. Sensor 64 continuously produces an analog output signal on line 65 representative of the instantaneous "sensitivity" of sensor 64 (i.e., the analog signal level corresponding to the instantaneous detected smoke or temperature level). Sensor 64 also responds to a test enable signal on line 63 from communication interface section 62 by simulating an "alarm" condition and producing an output signal on line 65 representative of an actual alarm condition (ie., a high level of detected smoke or temperature). The sensor output signal is coupled to communication interface section 62 via calibration unit 80, which allows the output voltage range of sensor 64 to be calibrated to correspond to a predetermined range of PWM current pulse widths transmitted by transponder 24. Sensor 64 alternatively generates its simulated alarm output signal on line 65 in response to a control signal from local test unit 82.

Figure 4:
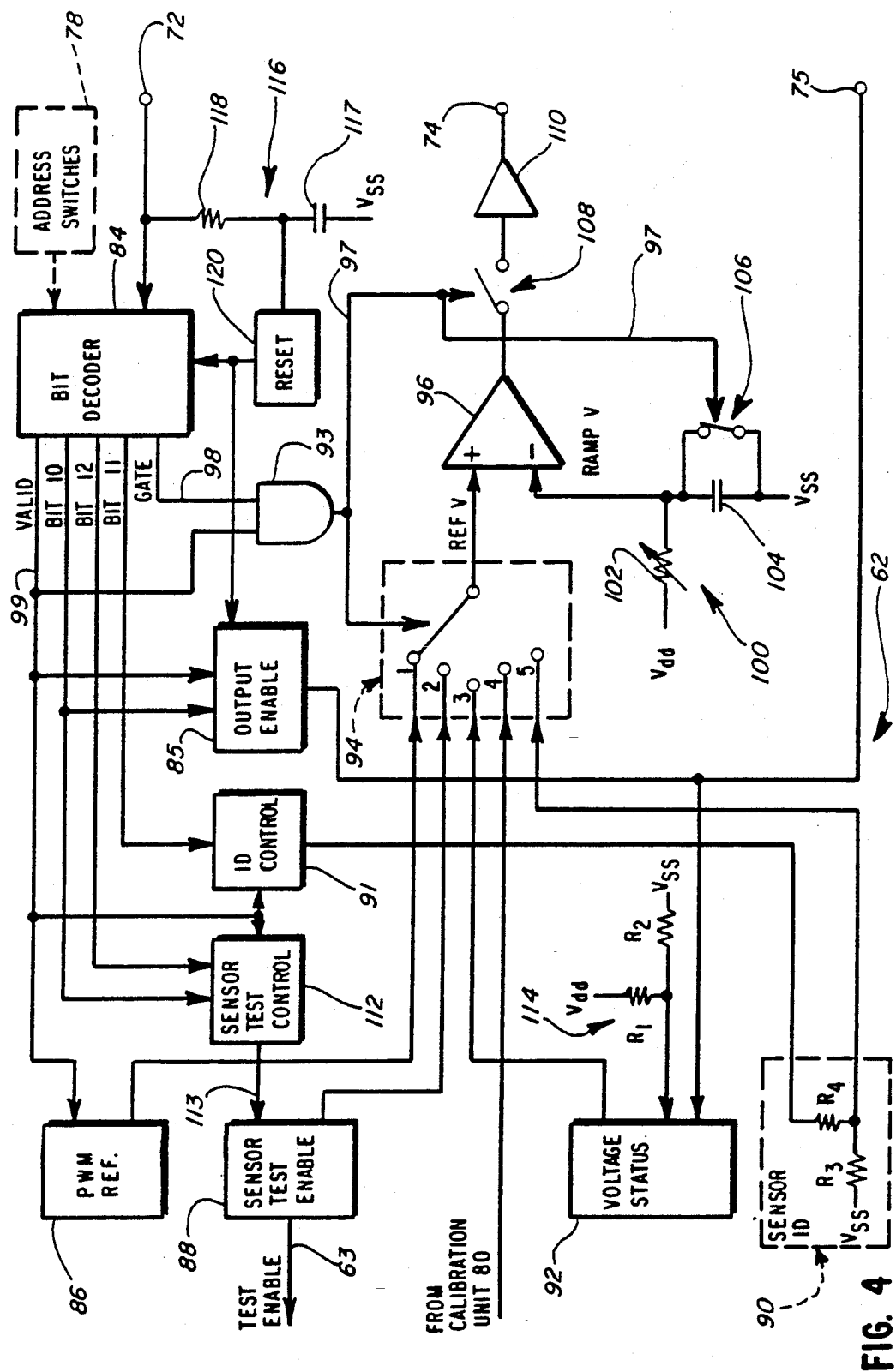
FIG. 4 is a block and schematic diagram of the communication interface section of the transponder of FIG. 3.

Referring to FIG. 4, communication interface section 62 includes a bit decoder 84 having an input connected to input port 72. Bit decoder 84 converts the pulses received on line 72 from loop interface section 16a to bit values and control signals for use in other parts of communication interface section 62. Communication interface section 62 also comprises PWM reference signal generator unit 86, sensor test enable unit 88 and sensor identification unit 90. Voltage status section 92 is also included, but is primarily used with module transponders 26, as discussed below.

The outputs of PWM reference section 86, test enable section 88, identification section 90 and status section 92 are coupled to switching unit 94 along with the calibrated output of sensor 64. Switching unit 94 is a single-pole, five throw digital, electronic switch for sequentially connecting each of five signals to the non-inverting input of a comparator 96 (in response to a control signal from bit decoder 84 via line 98 and gate 93) to provide reference voltages (Ref. V) for use in comparator 96.

The inverting input of comparator 96 is fed by a ramp voltage (Ramp V) signal from an R-C timing circuit 100 in response to the control signal on line 97. In R-C timing circuit 100, a variable resistor 102 (2 megohms) and a capacitor 104 (0.01 uF) are coupled in series between $V_{dd}$ and $V_{ss}$. Normally closed switching transistor 106, responsive to the control signal on line 97, is coupled across capacitor 104.

The output of comparator 96 is connected via a gating circuit 108 to driver 110, the output of which is applied to output current driver 70 (FIG. 3), specifically to the base of transistor 71, via output port 74. Gating circuit 108 is a normally open switching transistor actuated by the control signal on line 97.

Referring to FIG. 5, in operation, periodically loop interface section 16a initiates a polling or test sequence of a selected transponder 24 by generating a 13 bit PCM address/command word containing the 9-bit address 105 of the selected transponder and a 3-bit command 107 corresponding to the selected test. Bit 13 is a parity bit 109.

Referring also to FIG. 2, to transmit a 1-valued bit (e.g., bit 1 of FIG. 5) loop interface section processor 30 deactivates 24V driver 36 and activates 5V driver 38, which responds by pulling the voltage across communication line 22 down to 5 volts in a pulse. A 0-valued bit (e.g. bit 2 of FIG. 5) is generated by 0V driver 40 pulling the voltage across line 22 to 0 volts in response to a control signal from processor 30 on bus 35. At the termination of a bit, processor 30 de-activates the applicable driver 38, 40, and re-activates 24V driver 36 to re-establish 24 volts across line 22. Each bit has a duration of 207 μsec and they are separated by intervening periods of 207 μsec.

In the address code for the 9-bit address word, the first bit of the address word is 1-valued to address a smoke/fire detector transponder 24, and 0-valued to address a module transponder 26. The remaining eight bits of the address word are treated as a pair of four-bit sub-words, each representative of a decimal digit 0-9. The following discussion assumes the selection of a smoke/fire detector transponder 24, rather than a module transponder 26.

Referring also to FIG. 4, bit decoder 84 continually compares the voltage level of the signal at port 72 with a threshold voltage 111 (FIG. 5), such as 8 volts (with respect to $V_{ss}$), to detect when a bit appears on line 72 from loop interface section 16a, based on detecting a voltage transition from 24 volts to below 8 volts. Comparator circuitry (not shown) in bit decoder 84 determines whether the detected bit is a logical 1 (5V) or logical 0 (0V) by measuring the amplitude of the line voltage immediately after the beginning of the bit has been detected. Each detected bit is loaded (i.e. latched) in turn into a serial shift register (not shown) in bit decoder 84 when a rising transition above the 8 volt threshold is detected (indicating the termination of the bit). Thus, bit decoder 84 derives the address/command word transmitted by loop interface section 16a solely by detecting voltage transitions and voltage amplitudes on line 72 without the need for separate timing circuitry to indicate the beginning and end of any bit interval. Thus, if transmission problems occur at one bit rate, processor 30 may alter the bit rate and bit durations (in response to software in ROM 27) without affecting the operation of bit decoder 84.

When bit decoder 84 detects the thirteenth (parity) bit of the address/command word. The parity of the complete address word is tested for even parity. If parity is correct, bit decoder 84 checks the received address word 105 (bits 1-9) against the preprogrammed address of transponder 24 in address section 78. Only the transponder 24 having an address matching the received address will execute the command word 107 (bits 10-12). The other transponders 24 simply monitor communication line 22 for the next address/command word. If the detected parity bit, and command word are valid, bit decoder generates a "valid" signal on line 99 which enables communication interface circuit 62 to provide the modulation information necessary at port 74 to generate return PWM current pulses. If parity fails or the command word is invalid, bit decoder 84 does not generate the "valid" signal and current, pulses are not generated.

Referring again to FIG. 5, after the 13-bit PCM address/command word has been transmitted, loop interface section 16a transmits five successive data clock pulses on communication line 22 by dropping the voltage from 24 volts to 5 volts beginning at times DCLK1-DCLK5. The correctly addressed transponder 24 responds to the valid command word and the five clock transitions DCLK1-DCKL5 by returning five items of information to loop interface section 16a. It does this by drawing current on line 22 during five periods, each beginning at one of the DCLK transitions. The time duration (PW1-PW5) of each current pulse is modulated (i.e., PWM) in accordance with the item information being to loop interface section 16a.

The duration of each PWM data bit is controlled by comparator 96 (FIG. 4) in response to the difference between whichever reference voltage (Ref. V) is being applied to the non inverting input from switching unit 94 and the ramp voltage (Ramp V) fed to the inverting input from R-C circuit 100. At the start of each current pulse, bit decoder 84 detects the occurrence of the applicable transition (e.g. DCLK1) below the 8 volt threshold and responds by generating a control signal on line 98 (which is logically ANDed with the "valid" signal in gate 93) to: increment switching unit 94 to the next one of the five positions; open switch 106 to begin the ramp signal; and close gating switch 108 to deliver the output. Comparator 96 and driver 110 thus activate output current driver 70 (by turning on transistor 71, FIG. 3) to draw a constant current (such as 50 milliamperes) from line 22. Current source feedback 77 and emitter resistor $R_E$ maintain the current constant during the pulse. As soon as switch 106 is opened, capacitor 104 begins charging, and hence the ramp voltage (Ramp V) begins rising. Each PWM bit terminates at a time when the ramp voltage exceeds the reference voltage, at which time comparator 96 and driver 110 deactivate output current driver 70 to cease drawing current from line 22. As a result, the duration of time of each current pulse is proportional to the value on the selected one of the five inputs to switch 94.

Current sensor 46 (FIG. 2) in loop interface section 16a detects the start and termination of each PWM current value and notifies processor 30. Processor 30 measures the duration of each current pulse (PW1-PW5) to derive the information (such as the output of sensor 64) transmitted in the PWM current pulses by transponder 24.

After each PWM current pulse (PW1-PW5) terminates, processor 30 deactivates 5V driver 38 and reactivates 24V driver 40 to again place 24 volts across line 22. Bit decoder 84 detects the rising transition above the 8 volt threshold and opens gating switch 108 and closes switch 106 (to discharge capacitor 104) via a control signal on line 98. The procedure is repeated until all five items of information have been returned.

To help processor 30 to interpret accurately the value representated by the time duration of the PWM current pulse returned by transponder 24 during a given poll or test of a particular transponder, the first current pulse, beginning at DCLK1, has a reference pulse width (PW1) controlled by the output of PWM reference section 86. Bit decoder 84 enables PWM reference section 86 with the "valid" signal. PWM reference section 86 responds by coupling a reference voltage of $0.024V_{dd}$ to position #1 of switching unit 94. Upon detecting the falling edge of DCLK1, bit decoder 84 sets switching unit 94 at position #1 to couple the PWM reference voltage $(0.024V_{dd})$ to the non-inverting input of comparator 96. At this time, the output of comparator 96 is high, as is the output of driver 110, which "activates" current output current drive 70 to draw current from line 22. The current pulse terminates when the ramp voltage exceeds $0.024V_{dd}$ to provide a reference pulse width PW1 of, nominally, 150 $\mu$sec.

Processor 30 measures the actual width of the reference current pulse returned from transponder 24 and stores a calibration value equal to the ratio of the nominal and actual pulse widths PW1. The calibration value is applied to the four following current pulse widths (PW2-PW5) to improve the measurement accuracy of system 10. For example, if pulse PW1 is measured as 153 $\mu$sec, processor 30 knows that transponder 24 is returning current pulses 2% longer in duration that the nominal duration. Processor 30 reduces the measured durations of PW2-PW5 to obtain corrected measurement values.

During a polling/test sequence, a current pulse representative of either the instantaneous sensitivity of sensor 64 Or a simulated alarm condition is transmitted by transponder 24 in response to bits 10 and 12 of the command word. Bit decoder 84 couples latched bits 10 and 12 to a sensor test control unit 112, which produces a control signal on line 113 for sensor test enable section 88 in response to the values of bits 10 and 12. The truth table of sensor test control circuit 112 is as follows:

| Bit 10 | Bit 12 | Output (line 113) |
|---|---|---|
| 0 | 0 | 1 (test) |
| 0 | 1 | no change in state |
| 1 | 0 | no change in state |
| 1 | 1 | 0 (poll) |

As shown, bits 10 and 12 must agree to produce a change in the state of the output of sensor test control unit 112. Thus, single bit errors in bits 10 and 12 cannot change the output state. Further, a state counter in sensor test control unit 112 must be advanced by a valid combination of bits 10 and 12 ("00" or "11") in two consecutive, valid transmissions of the 13-bit PCM address/command word (that is, two consecutive polling/test sequences addressed to a given transponder 24) in order to change the output state of sensor test control unit 112. These features improve the immunity of the system to noise and other transients which may cause erroneous command word data bits to be received and latched by bit decoder 84.

Test enable section 88 produces a pair of output signals in response to a signal received from the output of sensor test enable circuit 112 A first output signal follows the logic state of the output of control unit 112 and is coupled to sensor 64 (FIG. 3) via line 63 as the test enable signal. A logical 1 test enable signal places sensor 64 in a "test" mode to produce an output signal on line 65 having an amplitude corresponding to an alarm condition. Sensor 64 responds to a logical 0 test enable signal by operating normally, thus producing an output signal having an amplitude representative of the instantaneous detected smoke or temperature level.

A second output of sensor test enable section 88 is connected to position #2 of switch unit 94. That output has an amplitude of $0.047V_{dd}$ if the output of sensor test control unit 112 is a logical 1 (to test sensor 64) and has an amplitude of $0.024V_{dd}$ if the output of sensor test control unit 112 is a logical 0 (to poll sensor 62).

Bit 10 is also applied to output enable unit 85, which provides a control signal via output 75 for sensor identification control unit 91 (described below) in response to the logic level of bit 10. If bit 10 is logical 1, output enable unit 85 produces a logical 1 output pulse (i.e. greater than $V_{dd} - 1.0$ volts) starting with the occurrence of the "valid" output of bit decoder 84 and terminating upon the occurrence of bit 1 during the next polling/test sequence initiated by loop interface section 16a. If, however, bit 10 is a logical 0, the output pulse does not terminate until a logical 1 bit 10 is received or a reset signal is produced by reset unit 120. The termination of such pulse provides a reset signal for voltage status section 92. The output enable pulse activates LED indicator section 76 and enables operation of identification control section 91 when such pulse is a logical 1.

Upon receipt of DCLK2, switching unit 94 is advanced to position #2 and comparator 96 and driver 100 begin current pulse PW2 in response to the second output of test enable section 88. The duration of current pulse PW2 depends on the level of such second output signal (which serves as the Ref. V signal for comparator 96) PW2 is nominally 150 μsec if sensor 64 is being polled and is nominally 300 μsec if sensor 64 is being tested. Thus, transponder 24 notifies loop interface section 16a, by modulating the width of current pulse PW2, whether communication interface section 62 has interpreted the command word as a command to poll or as a command to test sensor 64.

Upon the next transition (DCLK3), a current pulse having a width (PW3) corresponding to the output of voltage status section 92 is transmitted. This feature is primarily used with module transponders 26 and is discussed in detail below with reference to FIG. 6. In a detector transponder 24, however, voltage status section 92 responds to the output of voltage divider 114, which comprises a pair of resistors $R_1$, $R_2$ coupled between $V_{dd}$ and $V_{ss}$. The resistances of $R_1$ and $R_2$ are selected to provide a system code which may be used to identify, for example, the manufacturer of the transponder so that the outputs of "unauthorized" transponders may be ignored by processor 30. For example, if the voltage applied to status unit 92 is within a predetermined range (here between 30% and 70% of $V_{dd}$), status section 92 produces an output signal of $0.024V_{dd}$ which is coupled to position #3 of switching unit 94. If such applied voltage is above 70% of $V_{dd}$, an output voltage amplitude of $0.047V_{dd}$ is applied to position #3. A voltage of $0.70V_{dd}$ is applied to position #3 if status section 92 detects a voltage of less than 30% of $V_{dd}$. Transponder 24 produces a current pulse during DCLK3 having a duration (PW3) of 150 μsec (if the input voltage is in the predetermined range), 300 μsec (if the input voltage is above the range) or 450 μsec (if the input voltage is below the range). Processor 30 may be programmed to ignore returns from transponders producing other than a selected PW3 duration, thus preventing transponders built by unauthorized manufacturers from being "added-on" to system 10.

The output signal of sensor 64 is coupled to communication interface section 62 via calibration unit 80, which provides an input voltage for position #4 of switch unit 94 within a predetermined range of 0 volts to 2.25 volts (with respect to $V_{ss}$). Upon receipt of the fourth transition, DCLK4, comparator 96, driver 100, and output current driver 70 produce a current pulse on line 22 having a pulse width (PW4) modulated in accordance with the amplitude of the output voltage of sensor 64. The current pulse terminates when the ramp voltage produced by R-C circuit 100 exceeds such output voltage. Here, pulse width PW4 is between 0 μsec (for a 0 volt sensor output) and 1500 μsec (for a sensor output of 2.25 volts).

Processor 30 determines whether a "normal" or "alarm" condition exists at sensor 64 by measuring pulse width PW4, applying any necessary calibration to the measured duration in accordance with reference pulse width PW1 and comparing the calibrated value with an alarm threshold. The alarm threshold is a pulse duration of 1000 μsec. Thus, during testing, PW4 should be at least 1000 μsec or sensor 64 is malfunctioning. Because processor 30, rather than individual transponders 24, determines the existence of a normal or alarm condition, adjustments to overall system sensitivity to compensate, for example, for the aging of components, may be made at a central location (controller 12) rather than at each transponder 24. Also, processor 30 may store and average the results from several polling/test sequences to obtain information regarding the effects of aging on sensor 64. Processor 30 also need not generate an alarm immediately after receiving a pulse longer than the alarm threshold, but may first poll the sensor again to ensure that the initial return was not in error due to, for example, line noise.

Sensor 64 may be tested manually with local test unit 82, which comprises a manually operated switch (not shown) for applying $V_{dd}$ as a test enable signal to sensor 64.

Processor 30 is notified of the identity of sensor 64 (that is, whether the sensor is an ionization or photoelectric smoke detector or a thermal detector) by the width (PW5) of the current pulse transmitted by transponder 24 in response to bit 11 of the command word after the fifth falling edge, DCLK5. Bit 11 is coupled to identification control unit 91, which applies a high voltage ($V_{dd} - 1.0$ volts) to sensor identification section 90 when bit 11 is a logical 0 and applies a low voltage ($V_{ss} + 0.4$ volts) to identification section 90 when bit 11 is a logical 1. The output of control unit 91 is coupled through a voltage divider of resistances $R_3$ and $R_4$ in identification section 90. Thus, identification section 90 couples a signal to position #5 of switch unit 94 having an amplitude in accordance with the applied signal level from control unit 91 and the resistances $R_3$, $R_4$. Such resistances $R_3$, $R_4$ are preset in accordance with the identity of sensor 64.

Comparator 96, driver 110, and output current driver 70 produce a current pulse on line 22 during DCLK5 having a width PW5 of between 0 μsec and 1500 μsec corresponding to the identity of sensor 64 Processor 30 utilizes this identification information along with the sensor output information (PW4) and reference pulse (PW1) to determine the operating condition (i.e. normal or alarm) of transponder 24.

After processor 30 detects the termination of current pulse PW5, line 22 is again pulled to 24 volts and a reset signal is sent on line 22 by holding the voltage across line 22 at 24 volts for a duration greater than the time constant of R-C circuit 116 coupled between input port 72 and $V_{ss}$. R-C circuit 116 includes capacitor 117 (0.01uF) and resistor 118 (1.5 megohms). The output of R-C circuit 116 is connected to reset unit 120, which detects the charging of capacitor 117 above a reset threshold (80% of $V_{dd}$) to reset the shift register and parity checker in bit decoder 84 in preparation for the next test sequence from loop interface section 16a. Reset unit 120 also resets the output pulse from output enable circuit 85 to a logical 0.

It is noted that transponder 24 generates current pulses PW1-PW5 when a voltage of 5 volts is on line 22; that is, current sensor 46 in loop interface section 16a detects current on line 22 only when the voltage across line 22 is 5 volts. Thus, processor 30 may override a PWM current pulse by raising the line voltage to 24 volts. This produces more current on line 22 than output current driver 70 is capable of sinking. Also, bit decoder 84 detects the transition above 8 volts and deactivates gate 108.

Figure 6:
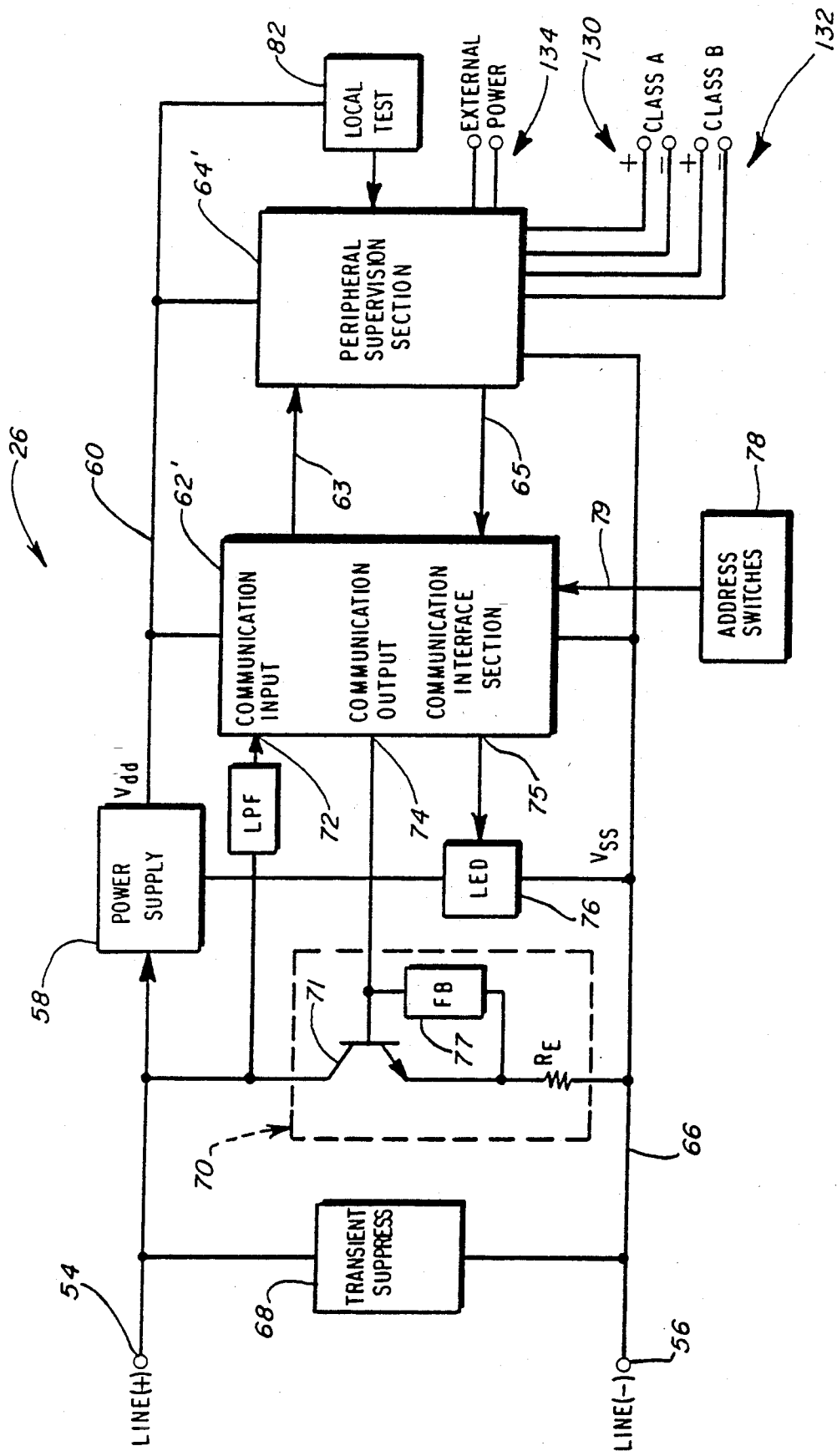
FIG. 6 is a block diagram of a module transponder of the system of FIG. 1.

Referring to FIG. 6, each module transponder 26 is similar in configuration to detector transponder 24 (FIG. 3), except that peripheral supervision section 64 replaces sensor 64 and is connected to peripheral device 28 (FIG. 1) via class A output port 130 and class B output port 132. An external power supply (not shown) is connected to power supply port 134. Peripheral supervision section 64', under control of modified communication interface section 62' by signals on line 63, switches peripheral device 28 between class A and class B operation. As is known, in class B operation, power is coupled to peripheral device 28 via only port 132. In class A operation, the (+) terminals of ports 130, 132 are connected together, as are the (−) terminals, to drive peripheral device 28 through a pair of parallel lines and thus more easily isolate breaks in the lines.

Peripheral supervision section 64' reports the status of peripheral device 28 to communication interface section 62' via line 65.

Figure 7:
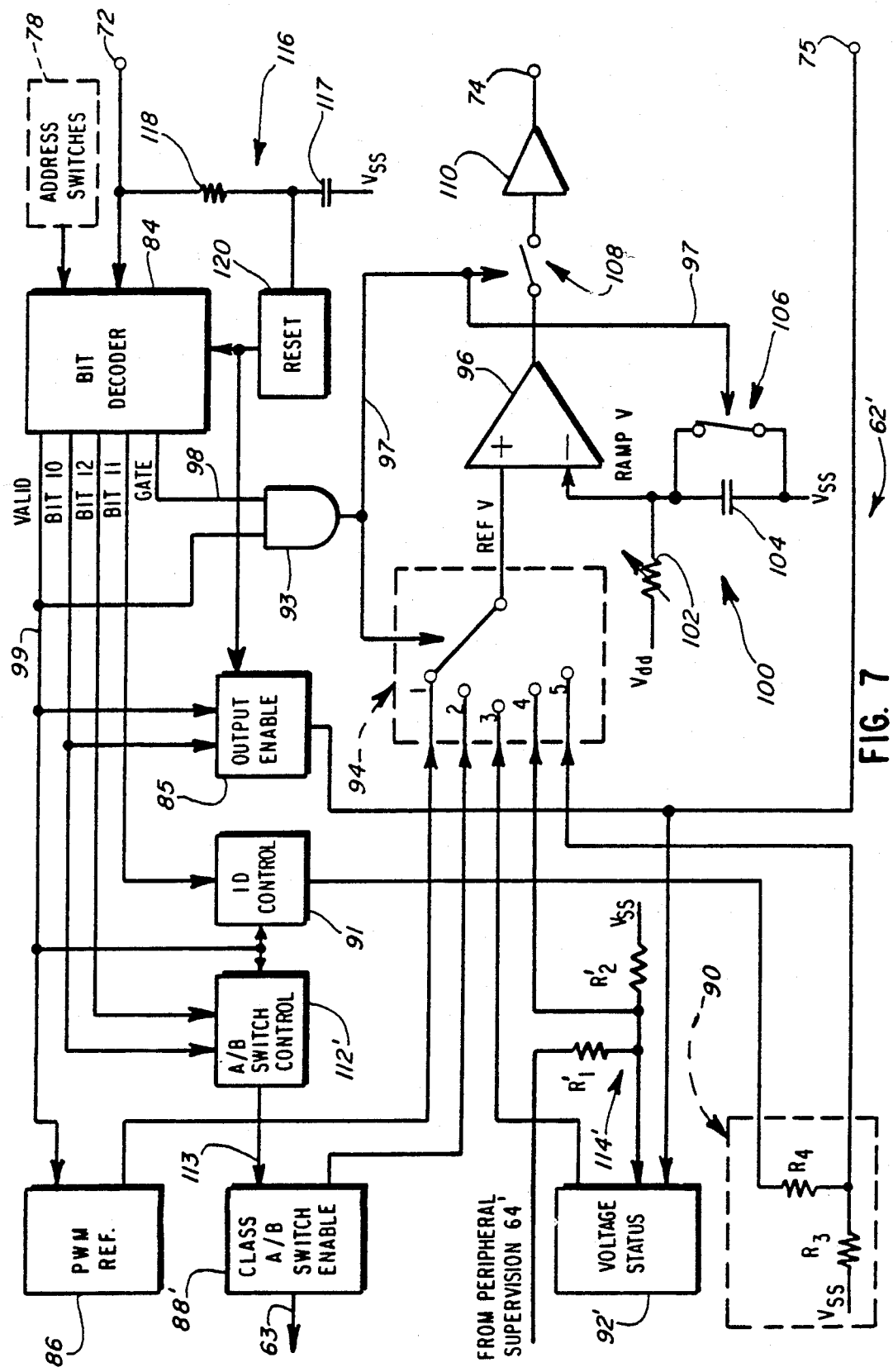
FIG. 7 is a block and schematic diagram of the communication interface section of the transponder of FIG. 6.

Referring to FIG. 7, modified communication interface section 62' includes a class A/B switch enable section 88' under control of switch control unit 112 Also, line 65 is connected as the source voltage for voltage divider 114', which provides the inputs for voltage status section 92' and position #4 of switching unit 94.

In operation, bit 1 of the address command word is a logical 0 to address a module transponder 26. Referring to the truth table for bits 10 and 12, when bits 10 and 12 are both logical 0 (for two consecutive polling/test sequences), class A/B switch enable section 88' places a logical 1 signal on line 63 to switch peripheral supervision section 64' into a class A connection with peripheral device 28. At the same time, class A/B switch enable section 88' couples a $0.047V_{dd}$ signal to position #2 of switching unit 94. Two consecutive transmissions of bits 10 and 12 as logical 1 result in class A/B switch enable section 88' coupling a logical 0 to peripheral supervision section 64' (to switch to class B operation) and a signal amplitude of $0.024V_{dd}$ to position #2.

Thus, module transponder 26 returns a current se beginning at DCLK2 to controller 12 having a duration (PW2) of 150 μsec for class B operation and 300 μsec for class A operation.

The return from peripheral device 28, connected to voltage status section 92 through voltage divider 114', provides an indication of the voltage supplied to peripheral device 28, which is measured by voltage status section 92. If the voltage at the junction of resistor $R_1'$, $R_2'$, is between 30% and 70% of $V_{dd}$, the voltage is in a normal range, and status section 92' couples a signal having an amplitude of $0.024_{dd}$ to position #3 of switching unit 94. If such voltage is above 70% of $V_{dd}$ (indicating an open circuit in the line connected to peripheral device 28), status section 92' couples a signal of $0.047V_{dd}$ to position #3. If the voltage at the junction of $R_1'$ and $R_2'$ is less than 30% of $V_{dd}$ (indicating that peripheral device contains a short circuit), a signal amplitude of $0.70V_{dd}$ is coupled to position #3.

Thus, module transponder 26 returns a pulse beginning at DCLK3 having a duration (PW3) of either 150 μsec (normal), 300 μsec (open circuit) or 450 μsec (short circuit).

Beginning at DCLK4, a current pulse having a duration (PW4) representative of the instantaneous amplitude of the return from peripheral device 28 is generated on line 22. Such pulse duration is between 0 μsec and 1500 μsec. This instantaneous measurement capability provides controller 12 with a running indication of peripheral unit 28 voltage so that a gradual increase or decrease of such voltage over time is observed, rather than waiting for a catastrophic fault (i.e., an open or short circuit).

Referring again to communication line 22, it typically comprises standard gauge (i.e. 12 to 18 gauge) twisted pair, single conductor wiring, which is a relatively poor signal transmission medium. For example, line 22 is highly reactive and does not have a characteristic impedance over a finite frequency bandwidth. Thus, the current pulses (PW1-PW5) produced on line 22 by transponders 24, 26 are received at loop interface section 16a with considerable distortion (for example, ringing on the leading and trailing edges), which makes accurate detection by current sensor 46 difficult.

Figure 8A:
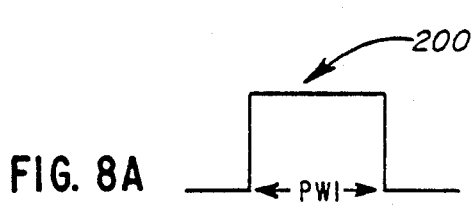
FIGS. 8A-8E are waveforms useful in understanding a feature of the system of FIG. 1.
Figure 8B:
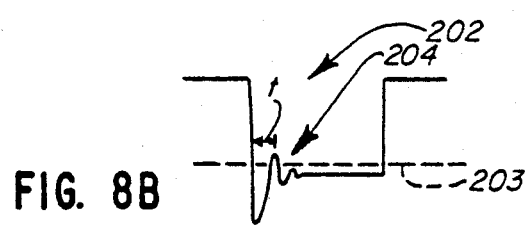
Figure 8C:
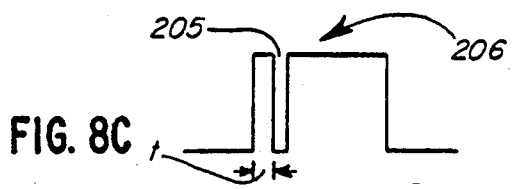

Referring to FIG. 8A, 8B the current-vs-time characteristic of one of the current pulses 200 (such as reference pulse PW1) as generated by current driver 70 results in a corresponding current pulse 202 detected by current sensor 46. Sensor 46 detects the drawing of current by transponder 24, 26 by measuring the line current (nominally, 50 mA) and comparing such current to a threshold level 203. Referring to FIG. 8C, because current pulse 200 is received with a considerable amount of ringing 204 at the leading edge of such pulse, any ringing which crosses threshold level 203 produces a gap 205 in the current detection output pulse 206 produced by current sensor 46.

Figure 8D:
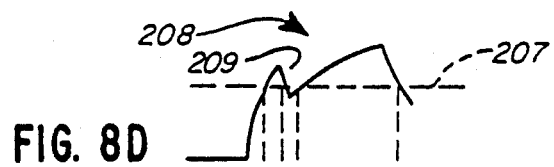
Figure 8E:
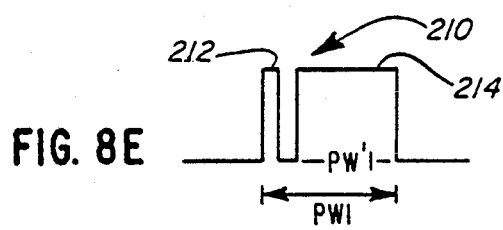

Referring to FIG. 8D, noise filter 52 (FIG. 2) integrates pulse 206 and applies a second threshold 207 to the integrated pulse 208. Portions 209 of pulse 208 falling below threshold 207 (due to gap 205) are filtered out from the pulse 210 coupled to processor 30, as shown in FIG. 8E. Thus, rather than measuring a single pulse width PW1, processor measures a pair of pulses 212, 214 of transient duration and duration PW1', respectively.

Figure 9:
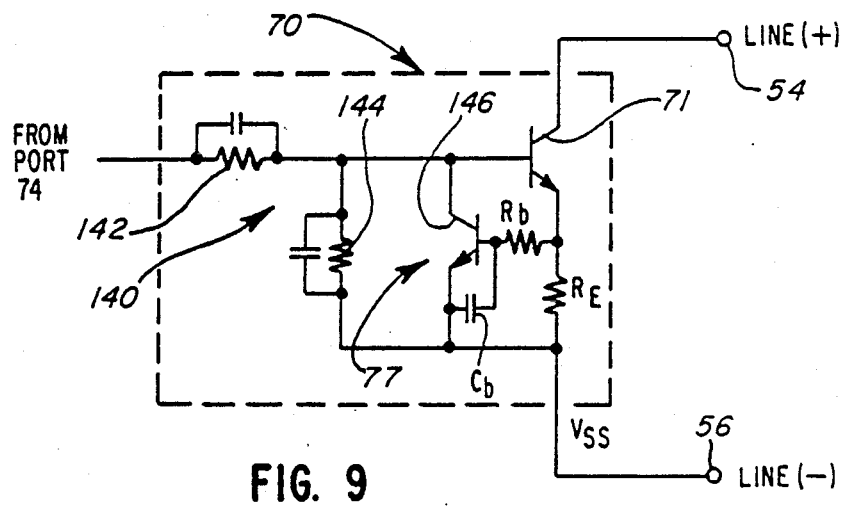
FIG. 9 is a schematic diagram of an overdrive circuit feature.

Referring to FIG. 9, the output driver circuit 70 in transponders 24, 26 may be modified as follows to compensate for such distortion of current pulses PW1-PW5 The base electrode of power transistor 71 is connected to communication interface section output port 74 through voltage divider 140 comprising resistors 142, 144. Feedback circuit 77, comprising transistor 146, is coupled between the emitter and base of transistor 71. A timing circuit comprising resistor $R_b$ and capacitor $C_b$ is connected as shown to the base and emitter of feedback transistor 146. Emitter resistor $R_E$ (here 12 ohms) is serially connected between the emitter of transistor 71 and $V_{ss}$, as shown.

In operation, driver 110 in communication interface circuit, when enabled at the start of a current pulse, produces a relatively large voltage which is reduced to approximately 3 volts at the base of transistor 71 by voltage divider 140. Transistor 71 conducts, producing about 2 volts across emitter resistor $R_E$, which draws a current of about 160 mA from line 22.

At this time, transistor 146 is nonconducting due to capacitor $C_b$. However, $C_b$ charges sufficiently in approximately 50 μsec (the time constant of $R_b-C_b$) to turn transistor 146 on, which reduces the base voltage (and hence the emitter voltage) of transistor 71. The voltage across $R_E$ thus falls sharply, to about 0.6 volts, which draws the nominal 50 mA current on line 22.

Figure 10A:
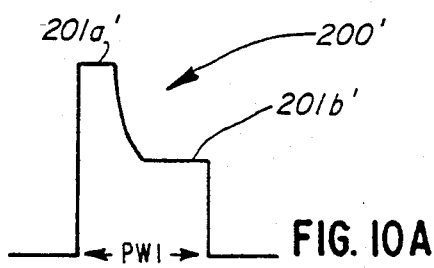
FIGS. 10A-10E are waveforms associated with the overdrive circuit feature

Referring to FIG. 10A, the current pulse 200' produced by driver 70 has a leading edge portion 201a' at 160 mA, with the remainder 201b' of current pulse 200' having an amplitude of 50 mA.

Figure 10B:
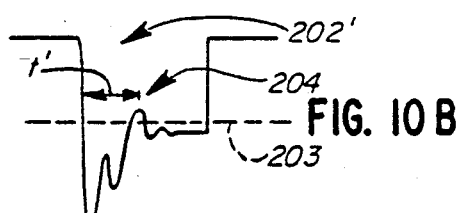

As shown in FIG. 10B, the current pulse 202' detected by current sensor 46 has a ringing portion 204' at the leading edge. However, the ringing is initially driven far below threshold level 203 by the large current amplitude of the leading edge with respect to the nominal amplitude which is to be detected with threshold level 203. Thus, although the ringing 204' eventually crosses threshold level 203, it does so at a time t' with respect to the leading edge which is somewhat greater than the corresponding crossing time t of received pulse 202 (FIG. 8B).

Figure 10C:
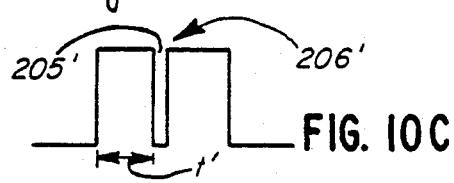
Figure 10D:
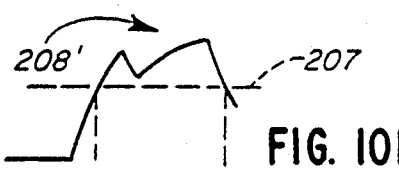

Referring to FIG. 10C, the output pulse 206' coupled by current sensor 46 to noise filter 52 has a gap 205' which occurs near the middle of pulse 206'. The integration of pulse 206' by filter 52 produces an integrated pulse 208' having a width PW1 above threshold 207 and which does not re-cross threshold 207 due to gap 205', as shown in FIG. 10D.

Figure 10E:
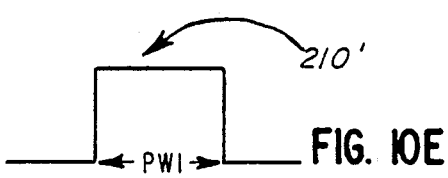

Referring to FIG. 10E, as a result, a single pulse 210' having the desired width PW1 is coupled to input port 50 of processor 30, thereby providing for accurate measurement of the duration of the current pulse produced by transponders 24, 26 despite line-induced distortion.

Figure 11:
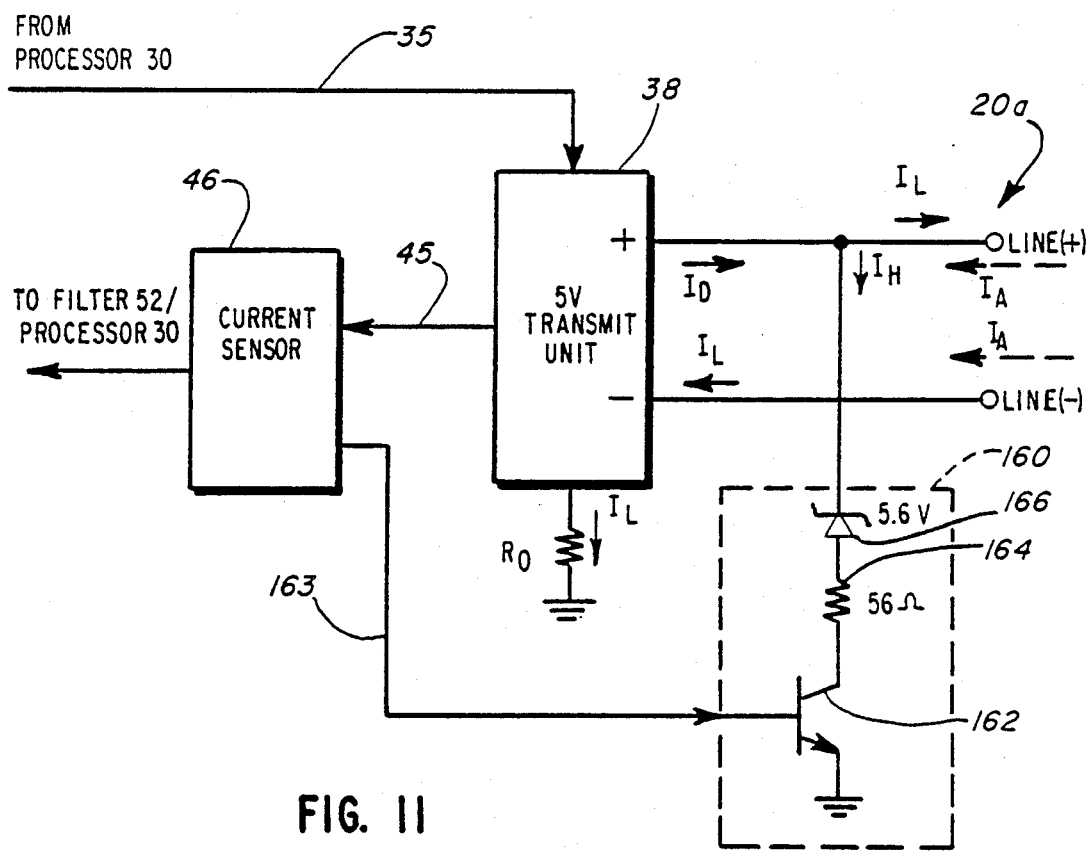
FIG. 11 is a functional block and schematic digram of an alternate embodiment of FIG. 2.

Referring to FIG. 11, loop interface section 16a further includes a hysteresis unit 160 to reduce the effects of noise appearing on lines (+) and (−) of communication line 22. Hysteresis unit 160 comprises transistor 162 having a grounded emitter and a collector serially connected to line (+) of line 22 through resistor 164 (56 ohms) and 5.6 volt zener diode 166. The base of transistor 162 is fed by a control signal from current sensor 46 on line 163. 5V driver 38 (as well as 24V driver 36 and 0V driver 40) is referenced to ground potential through resistor $R_{OF}$ (between 33 and 56 ohms) to help balance line 22.

Figure 12A:
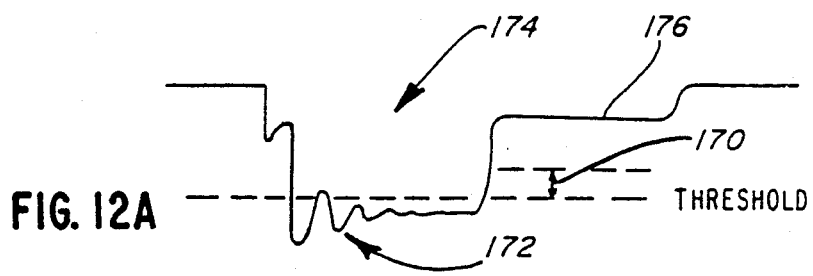
FIGS. 12A and 12B are waveforms associated with FIG. 11.

Referring to FIG. 12A, hysteresis circuitry is typically disposed in the current sensor itself to shift the threshold current detection level 170 in response to noise (such as ringing 172 on the line) so that ringing effects are ignored and the correct pulse width of current pulse 174 is detected. However, a quiescent current 176 often is present on the communication line. Thus, if threshold level 170 is increased too much (i.e., if too much hysteresis is introduced) the current sensor may detect quiescent current 176, which would render the current sensor incapable of detecting later occurring current pulses 174.

Figure 12B:
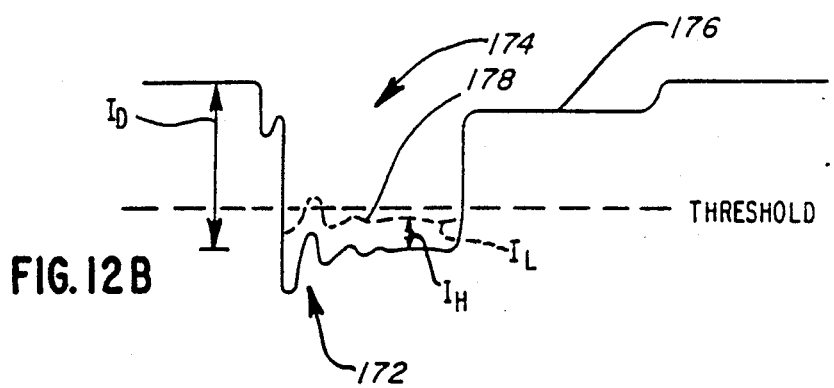

Referring to FIGS. 11 and 12B, in operation, when current sensor 46 detects the leading edge of the current pulses having a current $I_L$, the control signal on line 163 is activated to turn on transistor 162 to draw a current, $I_H$, from the (+) output of 5V driver 38. Thus, 5V driver 38 will produce a current amplitude $I_D = I_L + I_H$ on line (+) which is the current amplitude detected by current sensor 46. The return current $I_L$ from transponder 24, 26 is coupled to ground through $R_0$. Thus, line 22 "floats" above ground potential by $I_L R_0$.

Noise appearing on lines (+), (−) induces a current $I_N$. As the noise level increases, the current in line (−) tends to increase $(I_L + I_N)$, driving up the voltage on line (−) with respect to ground. 5V driver 38 maintains the voltage drop across line 22 constant and thus increases the voltage on line (+). Hysteresis unit 160 responds to the increase in voltage on line (+) by concommitantly increasing hysteresis current $I_H$ to offset noise current $I_N$ and thereby maintain the detected current $I_D$ constant despite the increase in noise.

Similarly, if the noise level on the lines (−), (−) decreases, noise current $I_N$ also decreases, lowering the voltage on the (−) line. 5V driver 38 correspondingly reduces the voltage on line (+) with respect to ground, reducing the hysteresis current $I_H$ so that noise current $I_N$ continues to be offset by hysteresis current $I_H$.

Thus, as shown in FIG. 12B, the threshold level 170 of current sensor 46 is not changed. Rather, the current level $I_D$ detected by sensor 46 is increased from line current $I_L$ by hysteresis current $I_H$ and changes correspondingly with the noise appearing on line 22. This provides greater noise immunity, since the difference between signal level and noise level is maintained constant to reduce noise effects, rather than changing a current threshold level in a current sensor in response to noise.

Hysteresis unit 160 stops conducting current $I_D$ when loop current $I_L$ drops at the end of the current pulse. That is, hysteresis unit 160 turns off before current sensor 46 detects the end of the pulse and deactivates the control signal on line 163. Hysteresis unit 160 cannot be turned on again until activated by current sensor 46. Thus, quiescent current 176 or noise appearing on line 22 when current pulses are not being drawn by a transponder 24, 26 does not activate hysteresis unit 160. This decreases the chance that line noise or quiescent current will be erroneously detected as a current pulse by current sensor 46.

Other embodiments are within the following claims.

What is claimed is:

1. A circuit for providing an information carrying signal to a line comprising:

means for providing an electrical signal to the line with a selected parameter representative of the information having a first value for a first predetermined period of time; and means, coupled to said providing means, for reducing said selected parameter of said signal to a second value still representative of the information, less than said first value, for a second predetermined period of time.

2. A circuit as in claim 1 wherein said providing means includes means for generating a current pulse of a first magnitude with the first magnitude representative of the information.

3. A circuit as in claim 2 with said reducing means including energy storing means for reducing said magnitude of said current pulse to a second value with said second value of current still representative of the information.

4. A circuit as in claim 1 coupled to a primal end o the line and a receiving circuit coupled to a distal end of the line, said receiving circuit coupled to a distal end of the line, said receiving circuit comprising:
   means for sensing an electrical signal having said first and said second values on the line; and
   means of filtering electrical transients from the sensed signal and for producing an output electrical signal having a singular value representative of the information for a third period of time substantially corresponding to a sum of said first and said second periods of time.

5. A circuit as in claim 1 with said providing means including current pulse generating line driver circuitry.

6. A circuit for reliably receiving an information carrying signal from a line in the presence of a noise transient on the line comprising:
   means, couplable to the line, for detecting a signal on he line; and
   means, coupled to said detecting means, for maintaining a selected signal parameter at a substantially constant value in the presence of extraneous transient signals, said means including means for increasing a selected noise minimizing current drawn from the line.

7. A circuit as in claim 6 with said signal detecting means including line current sensing means.

8. A circuit as in claim 7 with said increasing means including switching means coupled in parallel across said line.

9. A circuit as in claim 6 including a transistor for floating the line with respect to a selected reference potential.

10. A method of reliably sending information along a noisy communication lien from a sending end to a receiving end comprising:
    generating at the sending end an electrical signal having a first electrical value for a first time period and a second, electrical value, less than said first value, for a second time period with both electrical values representative of the information;
    sensing at the receiving end a received electrical signal corresponding to the generated signal; and
    processing the received signal and responsive thereto producing an output electrical signal having duration substantially equal to the sum of the first time interval plus the second time interval.

11. An apparatus for reliably transmitting pulse width modulated electrical signals from a sending end to a receiving end of a transmission line comprising:
    a transmitter, couplable to the sending end, said transmitter including circuitry for generating a first electrical signal having a first value for a first period of time and a second electrical signal having a second value for a second period of time; and
    a receiver, couplable to the receiving end, said receiver including circuitry for ensuing said first and said second electrical signals and for generating a pulse width modulated output electrical signal having an output vale for a period of time substantially corresponding to the sum of said fist and said second periods of time.

* * * * *